United States Patent [19]

Duvall et al.

[11] Patent Number: 5,884,033

[45] Date of Patent: *Mar. 16, 1999

[54] INTERNET FILTERING SYSTEM FOR FILTERING DATA TRANSFERRED OVER THE INTERNET UTILIZING IMMEDIATE AND DEFERRED FILTERING ACTIONS

[75] Inventors: William S. Duvall, Portola Valley; Matthew Kendall, Palo Alto, both of Calif.

[73] Assignee: Spyglass, Inc., Naperville, Ill.

[*] Notice: This patent issued on a continued prosecution application filed under 37 CFR 1.53(d), and is subject to the twenty year patent term provisions of 35 U.S.C. 154(a)(2).

[21] Appl. No.: 645,636

[22] Filed: May 15, 1996

[51] Int. Cl.[6] .................................................. G06F 13/00
[52] U.S. Cl. .................... 395/200.36; 395/20.55; 395/187.01
[58] Field of Search .................... 395/187.01, 200.3, 395/200.31, 200.55, 200.47, 200.54, 200.32, 200.34, 200.35, 200.36, 200.37, 200.8, 651, 652, 712; 707/10

[56] References Cited

U.S. PATENT DOCUMENTS

| | | | |
|---|---|---|---|
| 4,825,354 | 4/1989 | Agrawal et al. | 707/10 |
| 5,321,844 | 6/1994 | Schwagmann | 395/182.07 |
| 5,333,266 | 7/1994 | Boaz et al. | 395/200.36 |
| 5,446,898 | 8/1995 | Bealkowski et al. | 395/651 |
| 5,541,911 | 7/1996 | Nilakantan et al. | 370/422 |
| 5,606,668 | 2/1997 | Shwed | 395/187.01 |
| 5,619,648 | 4/1997 | Canale et al. | 395/200.36 |
| 5,619,698 | 4/1997 | Lillich et al. | 395/710 |
| 5,623,601 | 4/1997 | Vu | 395/187.01 |

*Primary Examiner*—Krisna Lim
*Assistant Examiner*—Viet Vu
*Attorney, Agent, or Firm*—Howrey & Simon

[57] ABSTRACT

A client-based filtering system compares portions of incoming and/or outgoing messages to filtering information in a filter database, and determines whether to block or allow incoming and/or outgoing transmissions of messages in response to the comparison. In response to a match between the portion of the message and the filtering information, the system can employ one of a number of different specified blocking options. The system has an update server that is accessible over the Internet and that has new filtering information for updating the filter database. The filter database can have a filter database stored on a server in a network coupled to the client.

24 Claims, 6 Drawing Sheets

INTERNET FILTERING SYSTEM FOR FILTERING DATA TRANSFERRED OVER THE INTERNET UTILIZING IMMEDIATE AND DEFERRED FILTERING ACTIONS

FIELD OF THE INVENTION

This invention relates to a system for filtering messages transmitted between the Internet and a client computer.

BACKGROUND OF THE INVENTION

While the Internet is very useful for obtaining information, many people are concerned that objectionable materials, especially sexually explicit materials, can be obtained too easily. Many parents are particularly concerned that their children can get access to such objectionable materials without supervision.

Congress recently passed the Communications Decency Act (CDA) to outlaw transmission of indecent material over the Internet. Many in the "Internet community" view the CDA as censorship, and have organized an online free speech campaign. Many also believe that parents should have the primary responsibility for controlling what their children obtain and view over the Internet.

OBJECT AND SUMMARY OF THE INVENTION

It is an object of the present invention to provide a system that allows Internet users to filter material transmitted over the Internet.

According to an embodiment of the present invention, a client-based filtering system compares portions of incoming and/or outgoing messages with filtering information stored in a filter database, and determines whether to block or allow the incoming and/or outgoing transmissions of messages in response to the comparison. In response to a match between certain information in portions of the message and the filtering information, the system can employ one of a number of different specified blocking options, including discarding incoming data, preventing execution of an open command, or replacing parts of received data.

In a preferred embodiment, the system compares an interface port and an IP address to a stored list of ports and addresses. If a match is found, the system can allow the message to be transmitted or block the message prior to transmission. The system can defer the decision whether to allow or block, and then monitor transmissions to search for a particular command and a particular filter pattern. If a pattern is detected during an outgoing message to a host server, the system can block resulting incoming transmissions from that server. Thus, the system can check both IP addresses and strings in URLs.

The system preferably communicates with a remote update server that has new filtering information for updating the filter database. The system periodically accesses the update server over the Internet, and downloads one of a number of new sets of filters from the server to replace some or all of the existing filters.

The filter database and all implementation software preferably reside on the client computer system. Alternatively, a filtering database and implementing software can be stored on a server in a network to which the client is coupled, and can thus be incorporated into a firewall, gateway, or proxy server.

To implement this system, the present invention also includes methods for patching the operating system to take into account multitasking and variable-length instructions. In Windows 95, in which a copy of certain library programs is made from disk into RAM for each application, the present invention uses patches to inject filtering code into RAM without modifying or replacing the library on the disk. These patches cause a buffer to store a series of copied instructions from a called routine, where the buffer is between certain head processing routines and tail processing routines. Because the library is not replaced or modified, the system can adapt to upgrades or reloading without the concern of losing modified or alternate variations of programs.

With the present invention, a user can filter material received over the Internet that is personally objectionable, whether that material is sexually explicit, violent, politically extreme, or otherwise, depending on that user's individual tastes and sensitivities. By providing updates online, the system can adapt as new sites and servers are added to the Internet. Other features and advantages will become apparent from the following detailed description, drawings, and claims.

DETAILED DESCRIPTION

Figure 1:
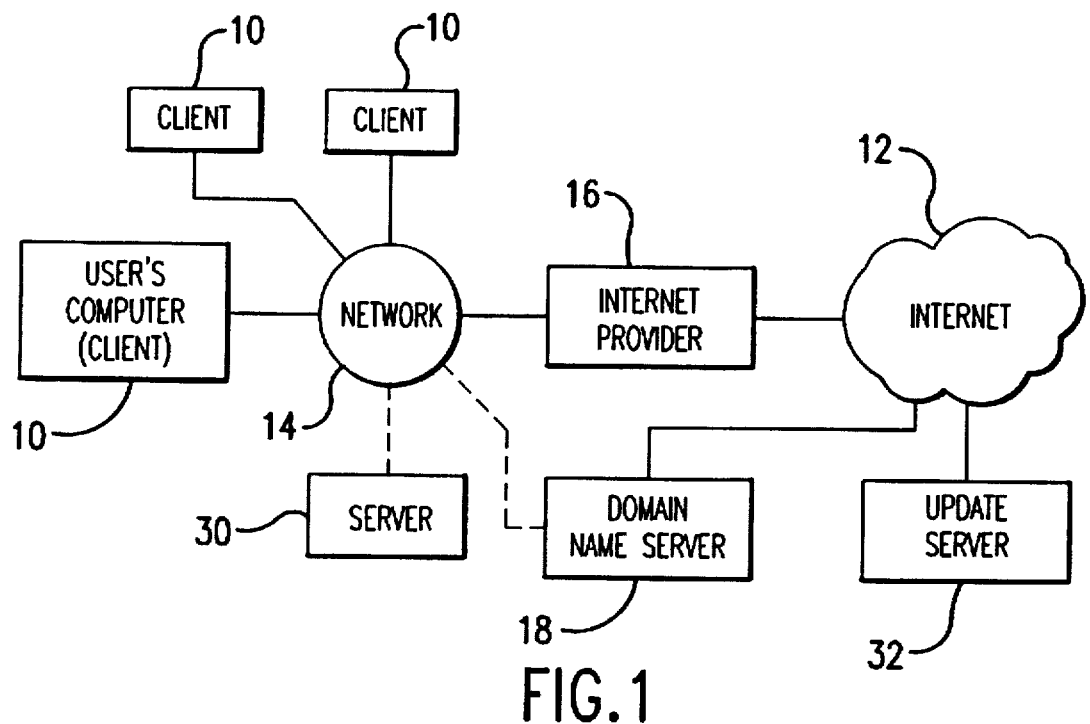
FIG. 1 is a block diagram of a network with a client computer for accessing the Internet.

A user uses a computer which serves as a client 10 to communicate with other computers over Internet 12. A number of clients are typically linked to a network 14, such as a local area network (LAN) or a broad-based commercial service. Many such networks are linked to one of a number of Internet providers 16, such as BBN, Inc. of Cambridge, Mass., which in turn, accesses the Internet.

Messages are transmitted over the Internet among computers with a transport protocol known as Transmission Control Protocol/Internet Protocol (TCP/IP). This protocol provides an error-free data connection between computers, and sits underneath and works in conjunction with higher level network protocols, including HyperText Transfer Protocol (HTTP); File Transfer Protocol (FTP); Network News Transmission Protocol (NNTP); Internet Relay Chat (IRC); and GOPHER.

According to the current Internet Protocol (version 4), each computer on or connected to the Internet has an IP address that identifies the location of the computer. Each IP address is a 32-bit number that is often written in the form n1.n2.n3.n4 (each nx represents an 8-bit number). (Version 6 of the Internet Protocol is expected to have 128-bit addresses, with one address for each interface, and with different types of addresses.) To initiate communications with another computer over the Internet, a computer opens a port in its interface for a TCP data stream. The computer sends messages that have defined fields for its own IP address and for the recipient computer's IP address.

With HTTP, a user can access web sites over the worldwide web using one of a number of commercially available web browsers, such as a Spyglass Mosaic web browser, available from Spyglass Inc. of Naperville, Illinois. To access a web site, the user enters a uniform resource locator (URL) request with the form "http://www.name.ext", where "http://" indicates the protocol, and "www.name.ext" is a domain name (although currently "www" is often not required). Such a domain name with this form typically points to a home page. The domain name can also be followed by other file names or directories, with the directories separated from the domain name and from other directories with slashes that serve as spacer characters. The directories sit below the home page, but are individually addressable and accessible. URL requests are also made with the other protocols noted above, such as FTP and NNTP.

When a user enters a URL request, the client provides the URL to a domain name server (DNS) 18. DNS 18, which may be accessed through the Internet or directly from network 14, looks up the domain name and returns the IP address associated with that URL (if the name is in DNS 18). The client opens a TCP data stream and uses this IP address to communicate with the other computer.

Domain names in a URL are often descriptive. For many companies and other organizations, the domain name includes their own name, a close variation, or some acronym of their name. Other Internet service providers use names that are descriptive of some service that is provided or some interest that is addressed, e.g., "www.chess.com." While many descriptive names may be nonobjectionable, others such as "xxx" or "sex" may be included in a URL of a server that provides sexually explicit material that may be objectionable to some users. The string "sex" could, however, be part of some completely different name, such as "Essex" or "sextet."

While the domain name itself may not be objectionable, there may be objectionable certain files or directories below that domain name. For example, some commercial online services allow users to build personal home pages but do not restrict the material on that home page. Consequently, some but not all of the directories may be objectionable. It could be undesirable to eliminate all accesses to such a domain name if only a relative few directories under that domain name are objectionable.

Figure 2:
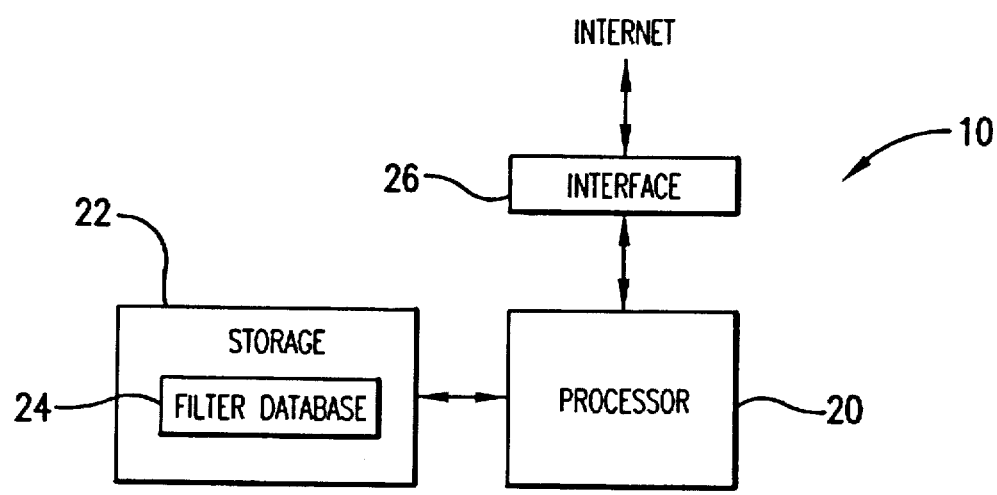
FIG. 2 is a block diagram of a client computer system with a filtering system.

Referring also to FIG. 2, in a first embodiment of the present invention, a filtering system resides in client computer 10. Processing by the filtering system is carried out by the computer's processor 20, and the system uses the computer's storage 22 to store a filter database 24. The filter database would typically be maintained in the client computer's hard drive, and could be copied to RAM during operation.

The client communicates with the Internet through an interface 26 that has a number of ports. By convention, certain default ports are associated with certain protocols; e.g., HTTP communications are typically transmitted through a port numbered 80. In the transmitted message, however, the user can specify another port that is different from the default port. Moreover, multiple ports can be used for one protocol, and one port could be used for multiple protocols. Thus, each TCP data stream passes through one of a group of numbered ports in interface 26. The client monitors these ports and maintains internal tables that indicate the state of each active TCP data stream, whether that stream is open or closed, for both incoming and outgoing transmissions.

The filter database has lists of filters, some of which are identified as either ALLOW filters or BLOCK filters for respectively allowing or blocking transmission. Both ALLOW and BLOCK filters in the database preferably have fields for port number and IP address. These fields can include a specific port number, a specific IP address, and/or meta values ANY IP and ANY PORT, which stand for all possible IP addresses and all possible port numbers, respectively. Thus, a filter can apply to a specific port and a specific address; to a particular port regardless of the address by specifying the port and ANY IP; to a particular address regardless of the port by specifying the address and ANY PORT; or even any address in any port for complete blocking or as a catch-all default by indicating ANY IP and ANY PORT.

Each filter entry in the filter database also has a field for specifying an action to be taken by the client if that filter were retrieved. These actions are essentially divided into two groups, direct action or deferred action. Direct actions indicate that the system should unconditionally allow or unconditionally block the transmission. When filter entries are retrieved, they are first scanned for entries that require direct action; if there are any, these actions are carried out immediately. Deferred actions are discussed in more detail below.

When a message is transmitted, whether that message is incoming or outgoing with respect to the client computer, the filtering system compares the IP address and/or other information in the data stream to the filter entries stored in the database to determine whether some action needs to be taken. The filters are preferably stored so that the system searches ALLOW filters first, BLOCK filters next, and deferred action filters last, and takes action based on the first matched filter. In this order, ALLOW filters thus take precedence over BLOCK filters; accordingly, if a specific IP address/port is matched by both an ALLOW filter and a BLOCK filter, the ALLOW filter takes precedence. Alternatively, selected BLOCK filters or all BLOCK filters can be searched before the ALLOW filters to make sure that certain messages are blocked.

Figure 3:
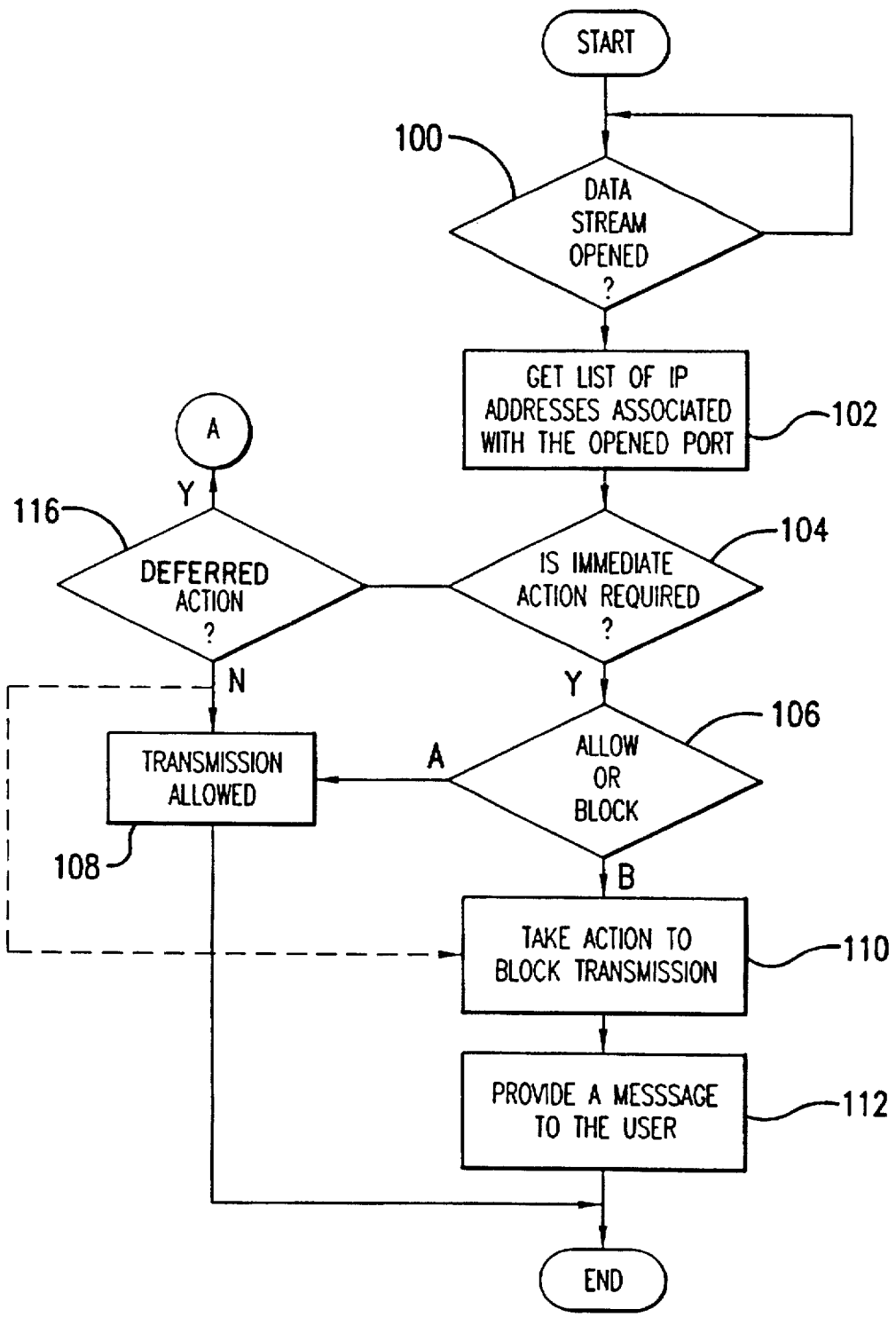
FIGS. 3 and 4 are flow charts illustrating filtering methods implemented by the filtering system.

Referring to FIG. 3, the filtering system can filter outgoing messages on the basis of the IP address of the host server that is being contacted by the client. The filtering system detects when the client opens the data stream for a particular port and IP address (step 100), and searches the filter database for matching filters. The system first searches by port number to get the list of filters with IP addresses associated with meta value ANY PORT and also with the particular opened port (step 102). The system then checks for and retrieves any filters that match the particular IP address. The retrieved filters are checked to determine if any require immediate action, i.e., if unconditional allowing or blocking is required (steps 104, 106). If such action is required and it is to allow the transmission, the system allows the transmission to proceed normally (step 108). If the immediate action is to block the transmission, the system takes action to block the transmission (step 110), and provides a "Blocked" message to the user (step 112).

When blocking is done on the basis of the IP address of the outgoing message, such blocking is preferably accomplished by simply not executing the open command. This nonexecution causes a failure result to be returned to the application (e.g., web browser) that called the open command. The system also provides a screen on the user's display indicating that the transmission was blocked, and advising the user on how to get back to the state before the user tried to open the stream and send the message.

If, at step 104, it is determined that no immediate action must be taken, it is determined whether a deferred action must be taken with respect to any of the retrieved filter (step 116). If there is also no deferred action, the system can default to allow the transmission (step 108), or it can default to block the transmission (steps 110 and 112). Such defaults can be implemented with a last filter that includes entries ANY PORT and ANY IP, and an action that indicates allow or block. As noted above, prior conflicting filters would take precedence over this effective default in the last filter.

Deferred filter entries preferably have additional fields, including fields for (1) a keyword, typically a command such as GET; (2) a filter pattern to be compared to data in the message, typically a string of characters; (3) a directional indicator (IN/OUT) for indicating incoming or outgoing transmissions; (4) a compare directive for the type of match; and (5) an action to be taken, typically to allow or block the transmission. The compare directive indicates a type of match, e.g., whether the pattern must match with equality, whether it must appear in a particular substring, or whether it can appear with a wildcard character before, after, before and after, or embedded in the string.

Figure 4:
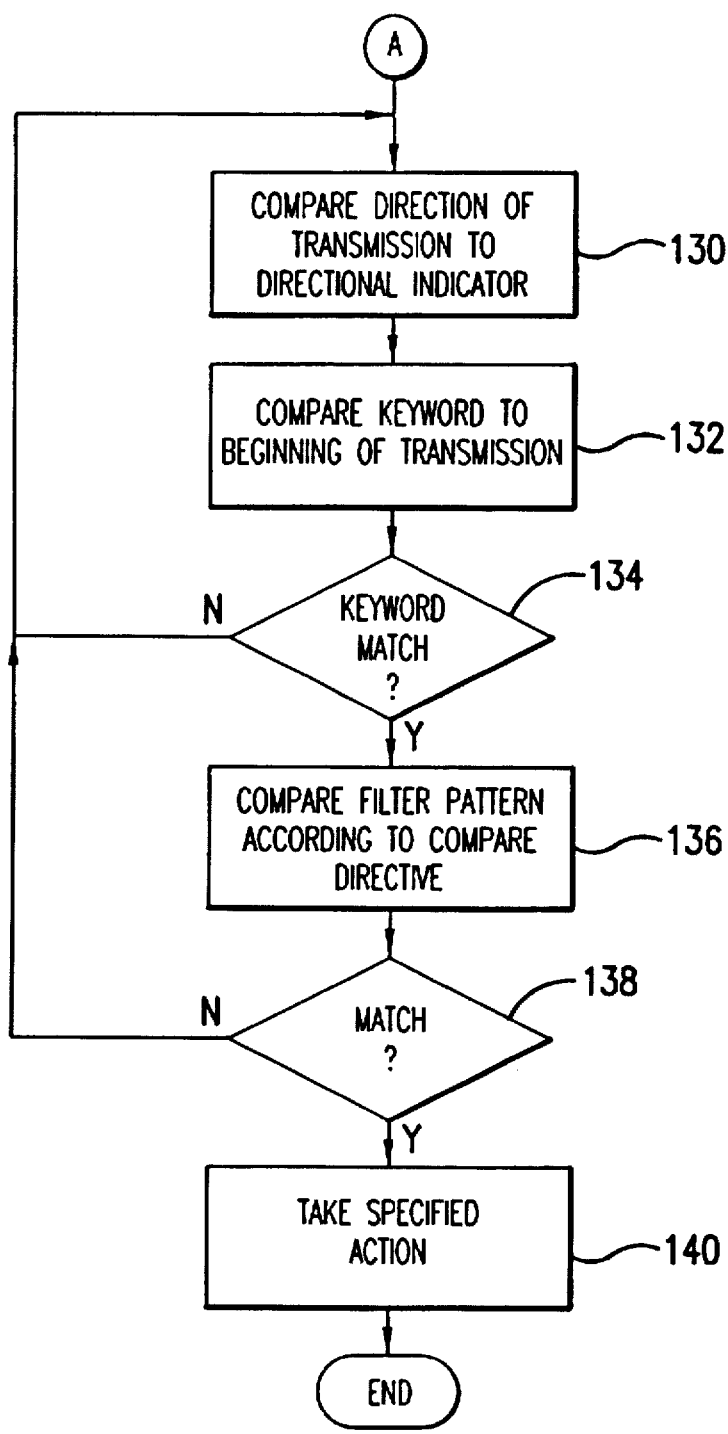

Referring to FIG. 4, when data is transmitted over an open TCP/IP connection, the direction of the transmission is compared to the directional indicators in the deferred entities (step 130). For each entry in a filter that matches the direction, the beginning of the data stream is compared to the keyword in the filter entry (step 132). If the key-words match (step 134), the data is further compared to the filter pattern of the filter(s) according to the compare directive (step 136). If a match is found at this level (step 138), the specified action in the filter is taken (step 140).

The filters are preferably queued so that filter pattern matching is performed when incoming data is received from the host server following a particular detected outgoing command. With such queueing, a similar scan of the message is performed on the outgoing transmission, but blocking is performed on the incoming message. Blocking actions that are available for incoming messages are different from those for outgoing messages. The incoming data can be discarded, replaced by data from the database, or edited to remove occurrences of entries containing patterns stored in the database entry. Because modifications to incoming data can change the length of the data, because the filtering system has no way of knowing how much data will be received, and because edits by the filtering system may result in the data stream being broken across an edit, the filtering system preferably locally buffers incoming data with a local fragment buffer. The contents of the local fragment buffer may be edited to change or delete portions of the data in another part of the buffer or in storage used temporarily. The unedited portion may be returned to the fragment buffer so that the entire transaction will be transparent to the application requesting the data.

Specified parts of the protocol message can be corrupted, or portions of the response to a protocol message can be deleted. These approaches are most commonly used when access is requested by a news reader to a news group over NNTP (or by a request to a chat channel over IRC). When such a request is made, the server responds with a list of news groups that match the request. While many of the news groups may be nonobjectionable, it may be desirable to block some of the listed items. The system allows certain listed items in the response to an NNTP request to be blocked while allowing certain other strings. With these options, even though some items are allowed, a "Blocked" message should be provided on the user's screen to notify the user of the action taken.

The locations, names, and meanings of keywords and filter patterns in the URL vary with the particular protocol. The system determines the particular protocol that is being used based on the port number as stored in the database. Thus the protocol is generally determined by the filters within the database, rather than by the filtering system software outside the database. When the system determines the protocol from the port, it then matches the specific URL (or group of URLs) based on locations in the URL where the commands are for that specific protocol. A pattern match is then performed on that part of the URL.

As an example of blocking an HTTP transmission, assume that the user requests "http://www.domain/test.html." The client transmits the URL request and the domain name server returns an IP address, e.g., 1.2.3.4, corresponding to the domain name. The client tries to open a TCP/IP connection with that IP address and typically with port 80. If that IP address and port 80 (or that IP address with ANY PORT) are together in a BLOCK filter, the system prevents the data stream from opening.

Rather than specifying blocking at this time, a filter can indicate a deferred action. In this example, the filter searches for a GET command as the keyword in an outgoing data stream, and for "test.html" as the filter pattern in the transmission. When the client sends a transmission with a GET command to get information under the directory test.html, the host server will respond with data for that directory. But if there is a blocking filter for test.html, the system can block the incoming data by discarding it or replacing it.

The filter pattern can specify particular strings for both allowing or for blocking. This can be useful when a potentially objectionable phrase may be part of an unrelated phrase. For example, the filters can cause the system to allow transmission of a directory with the string "sextet", while blocking transmission to or from a directory with the string "sex" by itself. By using wildcards (characters that stand for any non-alpha characters, such as "/" or "." before and/or after a particular phrase), particular appearances of "xxx" can be blocked, as it is less likely to be part of a nonobjectionable string; for example, if "★" indicates the wildcard, a filter pattern can be ★xxx★ indicates that any instances of xxx set off with periods, slashes, or other spacers within a URL will be matched by the filter.

While strings for filter entries may be searched sequentially, if there are many strings that need to be searched, the strings can be searched as a collection of strings organized by their beginning letter. In this case, the first character of each string is used as an offset into a table of starting positions in a string storage pool containing all of the strings to be searched. Strings within this pool are grouped by their beginning letter. The offset table contents for any letter contains the address within the pool of the first string beginning with that letter. This technique allows faster overall searching since only the strings that begin with the same letter need to be checked to determine a match. For more efficiency, a filter entry whose strings all begin with the same letter look for that letter specifically. If there is a match, then the remainder of the search is performed as described above, but beginning with the second character in the string being searched rather than the first.

Accordingly, when a match is found to a filter entry, whether the match is from an incoming message, outgoing message, an IP address, a phrase in a domain name, or a phrase somewhere else in the URL, the filter entry specifies one of a number of different actions with respect to different IP addresses and URLs. The filtering system can: (1) block access to a specific IP address, regardless of the port; (2) block access to a specific port, regardless of the IP address;

(3) block access to selected URL's on a specific port regardless of the IP address based on the content of the URL; e.g., prevent access to any web page containing the s letters "sex" or "xxx" in the URL; (4) block access to a URL or family of URLs at a specific IP address/port; (5) allow access to certain sites that would otherwise be blocked by the filter database; and (6) block access to all sites, and then allow access to specific sites, URLs, or families of URL's.

To implement option (6), for example, the system may have certain specified ALLOW filters, followed by a BLOCK filter for ANY PORT and ANY IP. The ALLOW filters would supersede later BLOCK filters, so the presumption is that what is not allowed is forbidden.

Updating Mechanism

Referring again to FIG. 1, when the system of the present invention is first loaded into a client system, it may have an initial set of filters for the filter database. Because Internet sites are being added to the Internet at a fast rate, however, the filtering system preferably also has an updating mechanism to keep the filters current. The updating mechanism in the filtering system can locate a particular HTTP or FTP update server 32 over the Internet. After optional user authentication, the updating mechanism causes the filtering system to download from the update server one of a number of new sets of filters, and preferably causes some or all of the existing filters in the filter database to be replaced with the newly downloaded filters When a user first installs the filtering system, the user is preferably provided with the authorization to make an initial download from the update server. This initial download addresses the potential problem of software aging on a store shelf. This download can supplement a filter database, or can be provided instead of an initial filter database. When the user updates with the initial download, the user is given an opportunity to obtain a subscription by filling out an on-screen subscription form to obtain further filter updates. Data from this form is transmitted and used to validate the user.

To obtain a download, the client identifies itself to the update server with a serial number. The server hashes the serial number into a value between 0 and 124 with a hashing function that provides a relatively uniform distribution of serial numbers over the range of numbers. The hash value is used to locate a file containing user data for serial numbers with that specific hash value. This data file is then downloaded into the client, and a search is conducted to find a matching entry in the client. If found, the entry contains subscription information, including expiration date, frequency of update, and identification of the filter set to be downloaded.

The update server can store and provide up to 65,536 different filter sets, each with a different group of materials to be filtered. The user data file indicates which set of filters is to be downloaded. Each set also includes additional information, including its creation date and version. If a download is made for a user who does not have an entry in the user database, the updater determines which set of filters to download.

The updating server sends email messages to a particular email address whenever a download or subscription occurs. These messages include date and time, the IP address of the user requesting the download, and the name and serial number of the user (if available). Alternatively, the updating mechanism can post information to a log file on a web server through a common gateway interface (CGI).

Editing Manager

In addition to an initial filter database and future updates, the filtering system has an editing Manager that allows the user to edit the database to add, delete, or modify filters in the database. The editing filter allows the user to make custom changes if the user believes that the filtering system is filtering too much or too little. The editing manager is preferably separately password protected. The system allows each filter to be examined individually.

The implementation and use of the editing manager are generally based on known database editing techniques. In addition, during a session over the Internet, a user can copy URLs for later editing. The user can then copy those URLs for inclusion in the database, or can edit the entry, e.g., to change the action from allow to block or vice versa.

Server-based System

Referring again to FIG. 1, according to another embodiment of the present invention, the filtering system can be provided from a server 30 that is on the client's own network 40. Such a topology may be more desirable, for example, in a corporate network that has a limited size and a uniform set of filters for many users. This version of the filtering system uses. the same type of filter database as a client-based filtering system, but the filter database is located on server 30.

The server-based system preferably has several other 30 differences. Because a server environment may not have ready access to the Internet's domain name services, and because efficiency is important, an application produces its own domain name table for rapidly converting a domain name into a unique 32-bit number (typically an IP address). To make this conversion, the domain name is hashed, and the hash is used to locate a list of symbol table entities with matching hash values. This list is searched associatively for an entry which matches the domain name being looked up. If found, the entry contains the unique 32-bit value.

An algorithm for pattern matching as described above may not be efficient enough for a server environment, and therefore an alternative search technique is preferably employed. First, a large list of representative URLs are analyzed to determine the frequency of combinations of characters, preferably two characters at a time. The resulting frequency information is stored in a Diphthong Frequency Table (DFT) that associates character combinations and their frequency.

Next, each filter pattern for each filter entry is searched to determine the character combination that is the least frequent according to the DFT. The pattern and a signed integer offset are used to calculate the start of the pattern from the location of the character combination being matched. The character combination and the filter pattern are used to make an entry in a probe table. The probe table is indexed by the character combination, and the indexed entry points to a list of patterns are characterized by that combination. In other words, each filter pattern is analyzed to find a character combination, preferably a character pair, that is least likely to occur in a target URL. The filter pattern is then stored in the probe table according to that least likely character combination.

Pattern matching is then accomplished by comparing each specified character combination in the candidate string to the entries in the probe table. Since commonly used character combinations will normally produce no hits in the probe table, the number of full string comparisons which need to be made is minimized.

As an example, assume a user enters a string that includes a series of letters, and the character combinations of interest are character pairs. The system successively checks the probe table for each pair of characters in the string, and for each of these pairs, if a string on the list of filters has one of these pairs that is least common, the system performs a comparison of the entire strings. Because some of the character pairs in the string will be common, it will be unnecessary to make comparisons for these pairs. Thus, by searching according to least common character pairs, the number of comparisons is substantially reduced.

Patching Code

The filtering system provides patching code for the client computer's operating system. This code is different for a Windows-based system and for a Macintosh-based system.

For a Macintosh-based system, when a PBControl call is *made, the parameters that are passed include a function selection variable that is compared to a bit vector containing values for all possible values of the function selector. If the bit vector has 0, no further filtering system code is executed, and the command is executed normally; if it is 1, the filtering system code is called before the normal command is executed. If the filtering system needs to take action after the normal execution of a command but before control is returned to the calling application, the stack of the application is modified so that when a return is made from the normal execution of the code, control goes to the filtering system patching code, and then returns to the application normally so that the application is not aware that the filtering system has been called.

In some cases, a command may be executed asynchronously. So far as the application is concerned, the call returns and sometime later a completion routine is executed. In this case, the filtering system creates a dummy piece of code that gets executed at completion time, and then correspondingly executes the application's completion routine in a manner that makes the presence of the filtering system undetectable, except for any blocking action that might be taken.

Figure 5A:
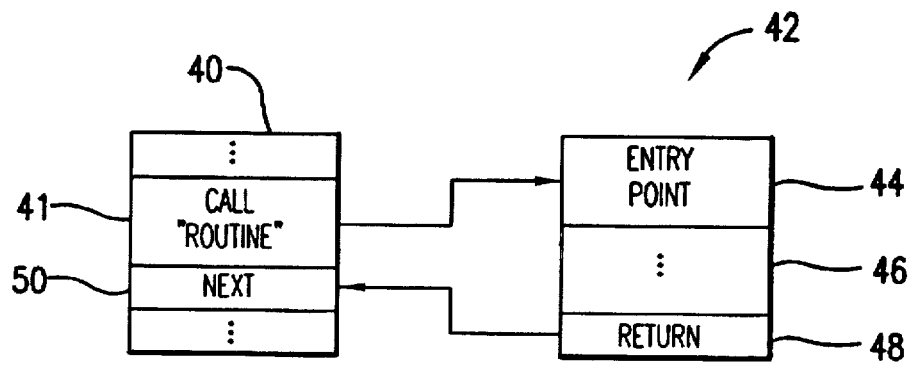
FIGS. 5(a)–5(d) are charts illustrating known and new patching methods.

Referring to FIG. 5(a), in a typical system without patching, an application 40, such as a web browser, has call instructions 41. A routine 42 has an entry point 44, a series of instructions 46, and a return 48 to the next instruction 50 after the call. Application 40 calls the routine, instructions 44-48 are executed, and control returns to the application.

Figure 5B:
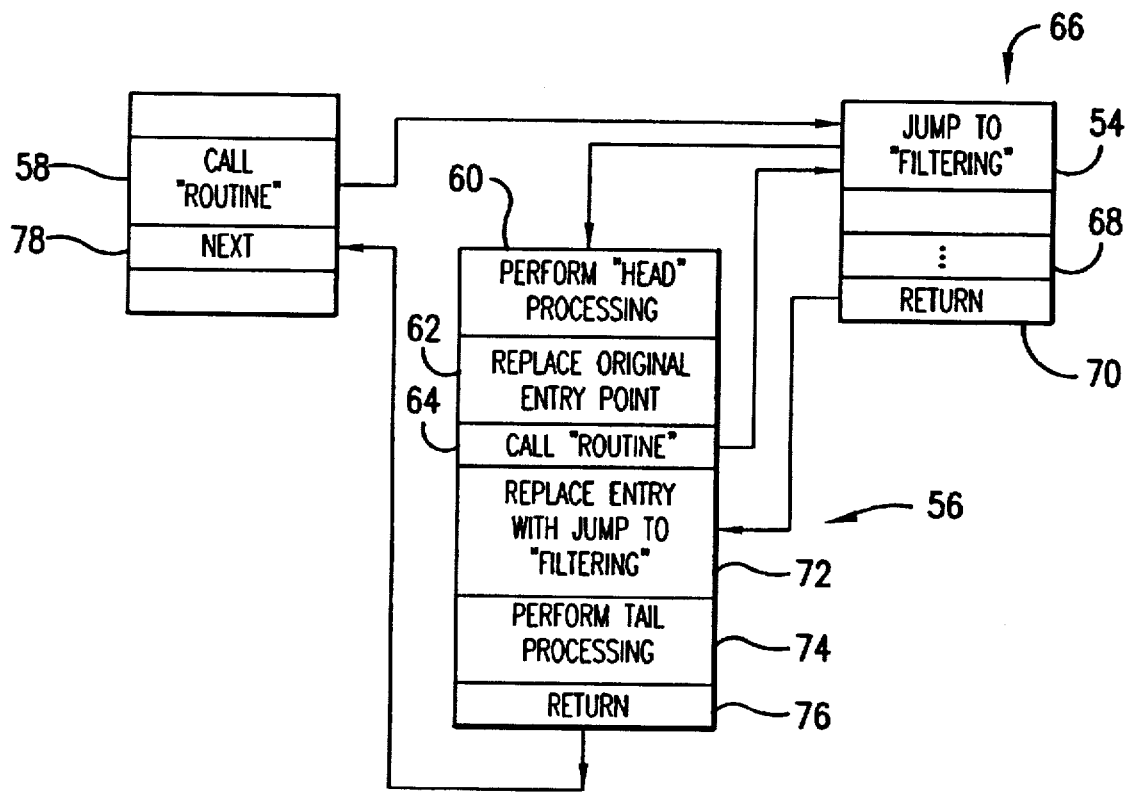

Referring to FIG. 5(b), under Windows 3.1 and 16-bit subsystems of Windows 95 (generally referred to as Win16), a Winsock API is patched by identifying all relevant entry points 54 and replacing them with a jump instructions to patch code 56, identified here as "filtering." Patch code 56 implements all head processing 60 which must take place before calling the application's call 58. Such head processing can include matching a port and a URL or IP address to filters in the database. The entry point of the instruction is reset to its original state in instruction 62 and the patch code has a call 64 to the patched routine 66 as a subroutine. After instructions 68, patched routine 66 has a return 70 to patch code 56. Patch code 56 has instructions 72 to re-replace entry 54 with a jump to the filtering patch code instructions 74 to perform tail processing (such a further filtering actions or blocking actions), and a return 76 to a next instruction 78 in the application. These patches are referred to here as soft patches and are generally known.

These soft patches can, however, have drawbacks with some operating systems, including Windows 95. Because the instructions have variable length, the initial replacement of the entry point in the originally called routine 66 may include only part of the first instruction or may include the first instruction and part of a second. Moreover, with a multitasking operating system, there is a period of time between instructions 62 and 72 when entry point 54 does not have a jump. Consequently, the filtering system could lose control during this time if another application calls that routine.

Figure 5C:
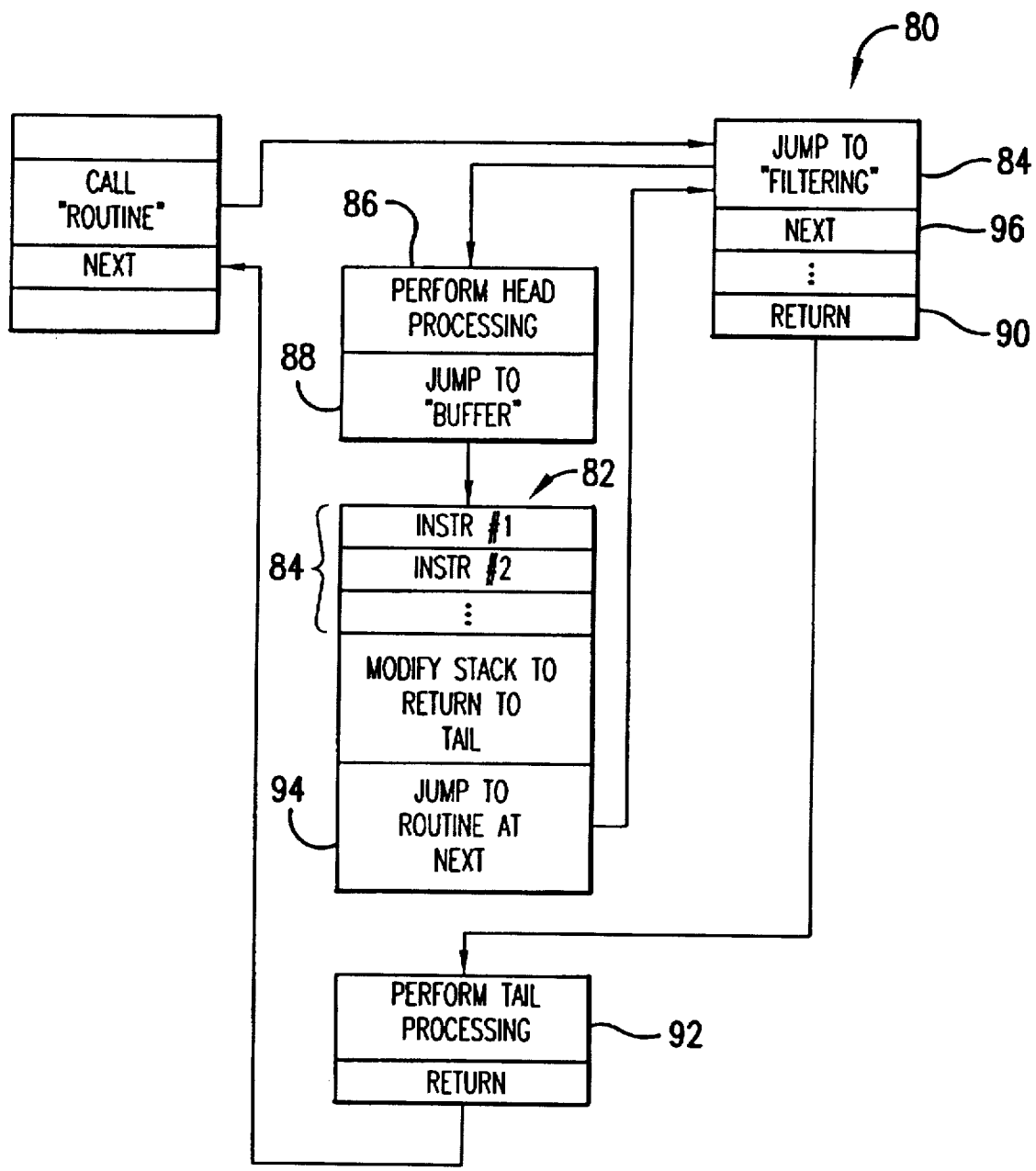

Referring to FIG. 5(c), to address these matters, other patches, referred to here as hard patches, are put in place. A hard patch to a routine 80 is achieved by copying to a buffer 82 the first several instructions 84 beginning with the entry point of routine 80. To determine which instructions are copied, instructions 84 are identified and selected so that the copied instructions have a minimum total length in bytes and an even number of bytes. These instructions are then modified if needed to operate in the buffer. Entry point 84 of routine 80 is replaced with a jump instruction to a head processing routine 86. After the head processing is a jump instruction 88 to buffer 82. Instructions 84 are executed and then routine 80 is modified so its return 90 points to tail processing 92. Next, an instruction 94 is added at the end of private buffer 82 to jump back into patched routine 80 a next instruction 96 after the jump. After return 90, processing returns to tail processing routine 92, which returns to the calling application that is unaware the filtering system has been called.

Such hard patches are generally used to patch when applications are created or loaded. These include the Load-Module system calls for Win16; and CreateProcess, LoadLibrary, and GetProcAddress in 32-bit portions of Windows (referred to generally as Win32), such as Windows 95.

Figure 5D:
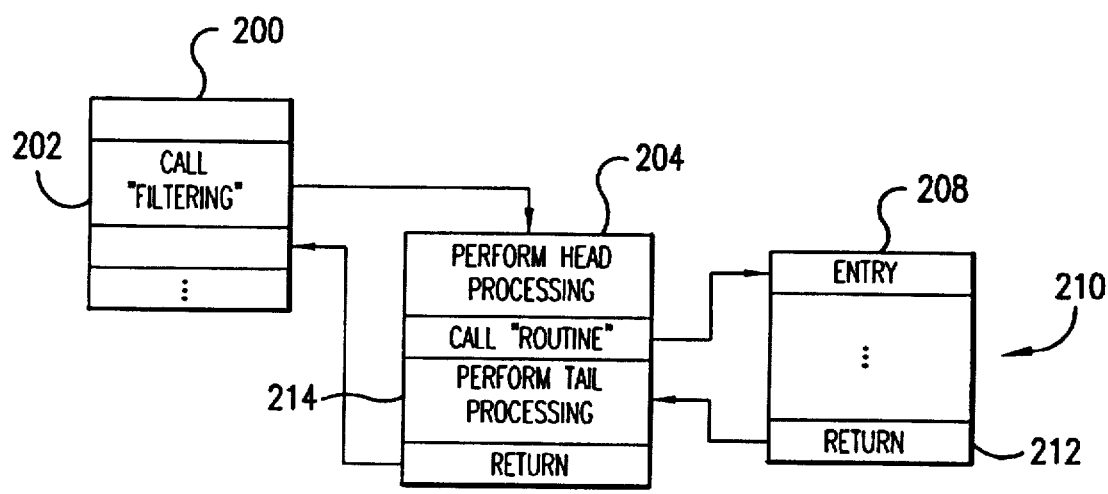

Referring to FIG. 5(d), to patch the Winsock API with Win32, an application's dll import table 200 is patched to replace Winsock calls with filtering system calls 202. These calls point to head processing 204. Next, a call 206 points to entry 208 of the original Winsock routine 210. After a return 212, the system performs tail processing 214 as necessary. Control then is returned to the application.

To inject patching code into the address space of a Winsock client without the need to modify or alter the library stored on disk, the following method is used: (1) during head processing of the CreateProcess call, the arguments are modified to create the process in an initially suspended state; (2) during tail processing of the CreateProcess call, the modules loaded into the address space s of the new process are examined, and if WSOCK32 has been loaded, the patching code is injected; (3) to activate the injecting code, the original entry point of the process on the stack is pushed to act as a call return address and the initial instruction pointer at a routine that loads filtering system code into memory and patches the applications import table is pointed to the routines of the filtering system; (4) if during tail processing of the LoadLibrary routine, WSOCK32 has been loaded by an application which is dynamically linking to Winsock (or a loaded library is implicitly linked to WSOCK32), a loading/patching routine is called; and (5) if an application dynamically links to WSOCK32 using the above LoadLibrary method, all calls to GetProcAddress are identified and the address of filtering system routines are returned to gain control of the API.

A Windows 3.1 application is installed to a publicly known directory with redundant duplicate hidden files in the DOS and Windows directories. To activate the filtering system, which is implemented as a monolithic executable program containing both the control panel and the blocking code, an item is added to the Startup menu, and a line is added to the WIN.INI file. Additionally, the file system.drv is replaced with a new system.drv that loads the original system.drv and aliases all of its entry points to point to the original routines. Additionally a "soft" hook is placed on a WinExec call so that the first time this routine is called, the filtering system is run and WinExec is unhooked.

These measures are also taken on Windows 95. Additionally, the control code and the blocking code are separated so that the control panel loads the blocking routines and provides on/off functionality, while the system-.drv hook loads both 16-bit blocking library routines and 32-bit library routines. To activate the filtering system, a reference to the executable program is added to the "Run-Services" registry key so that the operating system automatically executes the program on startup.

Once the filtering system library routine is loaded, it cannot be unloaded. Therefore, if a user kills the program by re-booting, the blocking mechanisms are left intact.

Having described preferred embodiments of the present invention, it should be apparent that other modifications can be made without departing from the scope of the invention as set forth in the appended claims. For example, the present invention can be readily adapted to new protocols, or updated versions of other protocols, such a new versions of the Internet Protocol.

What is claimed is:

1. A method for communicating with servers over the Internet to prevent or allow access to Internet sites, the method comprising computer-implemented steps of:
   (a) opening a data stream to send a message through an interface to an Internet server;
   (b) maintaining a database of filtering information comprising a table of filters, said table comprising
      (1) filters specifying immediate action, and
      (2) filters specifying deferred action;
   (c) comparing information in the message to filtering information in at least one of said filters specifying immediate action and said filters specifying deferred action; and
   (d) determining whether to prevent or allow the outgoing transmission of the message based on the comparison.

2. The method of claim 1, wherein some of the filters indicate that the message should be sent, and others indicate that the message should be blocked.

3. The method of claim 1, wherein in step (b) the filters specifying immediate action comprise fields specifying an interface port, an Internet Protocol (IP) address, and an action to be taken if the filtering information matches the information in the message.

4. The method of claim 3, wherein step (c) includes comparing an Internet Protocol (IP) address of the message to the filtering information.

5. The method of claim 1, wherein in step (b) the filters specifying deferred action comprise fields specifying a keyword, a filter pattern, a compare directive, and an action to be taken if the filtering information matches information in the message.

6. The method of claim 5, wherein the message includes a URL, and step (c) includes comparing a domain name in the URL to filtering information in at least one of said filters specifying immediate action and said filters specifying deferred action.

7. The method of claim 6, wherein step (c) includes comparing file information in the URL to the filtering information.

8. The method of claim 5, wherein step (c) includes comparing a command after a connection has been opened to filtering information in at least one of said filters specifying immediate action and said filters specifying deferred action.

9. The method of claim 1, wherein steps (a)–(d) are all performed by a client computer, step (b) including maintaining the database in storage residing on the client computer.

10. The method of claim 5, wherein step (c) includes comparing strings in the message against strings in at least one of said filters specifying immediate action and said filters specifying deferred action, the strings in the filter database being maintained based on the least common string in the filter entry.

11. The method of claim 9, further comprising a step of updating the database by downloading new filtering information from an update server, the update server being accessible to the client computer over the Internet.

12. The method of claim 11, wherein the updating step includes replacing at least some of the information previously stored in the database.

13. The method of claim 5, wherein the message includes a URL, wherein step (c) includes comparing a command in the URL to at least one of said filters specifying immediate action and said filters specifying deferred action.

14. The method of claim 6, wherein step (c) include comparing directory information in the URL to the filtering information.

15. A method for filtering messages transmitted over the Internet to prevent or allow access to Internet sites, the method comprising computer-implemented steps of:
   (a) maintaining a database of filtering information comprising a table of filters, said table comprising
      (1) filters specifying immediate action, and
      (2) filters specifying deferred action;
   (b) comparing information in the message to filtering information in at least one of said filters specifying immediate action and said filters specifying deferred action; and
   (c) determining whether to prevent or allow transmission of the message in response to the comparison.

16. The method of claim 15, further comprising a step (d) of updating the filtering information by downloading from a remote server via the Internet new filter information for storage in the database of filter information.

17. The method of claim 16, wherein step (d) includes replacing the existing filter information with the new filter information.

18. The method of claim 16, wherein the update server has a number of sets of new filter information, the method further including a step of providing to the server a message indicating which set of filters to download.

19. A method for communicating with servers over the Internet to prevent or allow access to Internet sites, the method comprising the computer implemented steps of:
   (a) sending messages to and receiving messages from an Internet server through an interface;
   (b) maintaining a database of filtering information comprising a table of filters, said table comprising
      (1) filters specifying immediate action, and
      (2) filters specifying deferred action;
   (c) comparing information in the messages to filtering information in at least one of said filters specifying immediate action and said filters specifying deferred action; and (d) determining whether to prevent or allow transmission of the messages based on the comparison;

wherein steps (a)–(d) are performed by a client computer connected to the Internet through a network server.

20. The method of claim 19, wherein step (d) comprises a determination to prevent transmission of the messages, the method further comprising steps of buffering the messages in a buffer, discarding at least part of the incoming messages, and displaying a message indicating that the transmission was prevented.

21. The method of claim 18, wherein in step (b) the filters specifying deferred action comprise fields specifying a keyword, a filter pattern, and an action to be taken if the filtering information matches information in the messages.

22. The method of claim 19, step (c) including comparing messages sent to the Internet, the method further comprising the step of queuing the filtering information.

23. A method for communicating with servers over the Internet to prevent or allow access to Internet sites, the method comprising the computer-implemented steps of:

(a) opening a data stream to receive a message through an interface from an Internet server;

(b) maintaining a database of filtering information comprising a table of filters, said table comprising (c) filters specifying immediate action, and (d) filters specifying deferred action;

(e) comparing information in the message to filtering information in the filters specifying immediate action and filters specifying deferred action and (f) determining whether to prevent or allow the incoming transmission of the message based on the comparison.

24. A method of executing a hard patch for a called computer routine comprising the computer-implemented steps of:

(a) identifying instructions and copying a number of instructions with a minimum number of bytes from an entry point of a called routine to a buffer;

(b) providing an application calling the called routine;

(c) jumping from the called routine to a head processing routing;

(d) performing the head processing routine;

(e) jumping to the buffer;

(f) executing the copied instructions;

(g) returning to the called routine after the jump of step (c);

(h) returning to a tail processing routine;

(i) performing the tail processing routine; and (j) returning to the calling application.

* * * * *